United States Patent
Palmer et al.

(10) Patent No.: US 8,359,972 B2
(45) Date of Patent: Jan. 29, 2013

(54) MILITARY COOKER

(75) Inventors: Michael Frank Palmer, Poole (GB);
Sean Paul Duffy, Broadstone (GB)

(73) Assignee: Hawkmoor Limited, Exeter (GB)

( * ) Notice: Subject to any disclaimer, the term of this patent is extended or adjusted under 35 U.S.C. 154(b) by 664 days.

(21) Appl. No.: 12/436,258

(22) Filed: May 6, 2009

(65) Prior Publication Data

US 2009/0277337 A1    Nov. 12, 2009

(30) Foreign Application Priority Data

May 6, 2008   (GB) .................................. 0808167.1

(51) Int. Cl.
*A47J 37/12* (2006.01)

(52) U.S. Cl. ........... 99/403; 99/405; 99/407; 126/378.1; 126/376.13; 431/10; 431/181

(58) Field of Classification Search .................... 99/403, 99/405, 407; 126/77.1, 378.1, 390.1, 391.1, 126/350.1, 91 A, 1 R, 39 R, 211, 344, 345, 126/347, 373.1, 376.13; 431/10, 181, 182, 431/183, 187, 264, 265, 266, 352, 353
See application file for complete search history.

(56) References Cited

U.S. PATENT DOCUMENTS

| 4,913,041 | A | * | 4/1990 | Taber et al. ...................... 99/403 |
| 5,642,660 | A | * | 7/1997 | Killgore et al. .................. 99/403 |
| 5,975,071 | A |   | 11/1999 | Babington |
| 6,357,344 | B2 | * | 3/2002 | O'Grady et al. ................. 99/447 |
| 6,508,645 | B1 | * | 1/2003 | George .......................... 431/266 |
| 6,539,843 | B2 | * | 4/2003 | Andress ......................... 99/400 |
| 6,786,139 | B2 | * | 9/2004 | Ponting et al. ................. 99/403 |

FOREIGN PATENT DOCUMENTS

| DE | 3223108 A1 | 12/1983 |
| EP | 0560552 A2 | 9/1993 |
| WO | 2005018391 A2 | 3/2005 |

\* cited by examiner

*Primary Examiner* — Gene Kim
*Assistant Examiner* — Urszula M Cegielnik
(74) *Attorney, Agent, or Firm* — Arthur Jacob

(57) ABSTRACT

A cooker for use by troops on deployment comprises a container 10 for cooking fat sitting upon a heating chamber 12. The heating chamber 12 has a back wall 14 formed with an aperture 16 to receive a burner and a front wall 18 formed with an exhaust port 20 communicating with a chimney 22. The heating chamber has side walls extending between its front and back walls 18 and 14. The container has a hinged lid 28 which folds to present a rack 30 for food frying baskets (not shown). The cooker is configured and arranged so that flame from the burner does not contact the container 10 and heat is diffused over the container 10, whereby cooking fat therein is not locally overheated.

19 Claims, 6 Drawing Sheets

MILITARY COOKER

CROSS REFERENCE TO RELATED APPLICATIONS

This application claims priority from United Kingdom Patent Application No. 08 08 167.1, filed 6 May 2009, the entire disclosure of which is incorporated herein by reference in its entirety.

BACKGROUND OF THE INVENTION

1. Field of the Invention

This invention concerns a cooker particularly but not necessarily exclusively for use by troops on deployment.

2. Description of the Related Art

Deployed troops need, of course, to be provided with hot food whenever possible, but sources of cooking fuel are limited. Nevertheless many previous cookers have been proposed for use by troops on deployment. Typically such cookers have a diesel-fired burner (diesel fuel being widely available) arranged to heat a container of water wherein food is cooked, or prepared food such as pouch meals or ration packs are heated. The cookers may be located in temporary deployable accommodation (TDA).

Some popular foods such as chips, doughnuts and fried chicken need to be cooked in fat rather than water, and this introduces a risk that the fat will be carbonised, and as a result food cooked therein will be tainted. (For the avoidance of doubt it should be noted that the term "fat" as used herein includes cooking oils). This risk is most notable (a) when solid cooking fat is first heated, especially where there are voids in the fat, and (b) when liquid cooking fat has been previously used and contains residual food particles. Further, for safety (especially in TDA) it is important to keep the temperature of the cooking fat below its flash point of around 320° C.

It is difficult to meet these requirements in a portable cooker such as may be used by troops on deployment. Most such cookers are designed for heating water. An example of this is the tray ration heating system described in International Patent Application WO 2005/018391, which has a water reservoir heated from a firebox and is notable for recording a temperature of 1945° F. (=1063° C.) immediately below the reservoir adjacent the firebox and a temperature as high as 962° F. (=517° C.) at the end of the reservoir away from the firebox—that is, temperatures greatly above the flash point of cooking fat. An example of a portable cooker designed for frying is described in European Patent Application EP 0560552, and this shows a container of cooking oil having a gas-fired combustion chamber within the container and in direct contact with the oil, from which it is evident that the oil close to the combustion chamber will necessarily be much hotter than the rest of the oil and therefore at risk of carbonising. Those skilled in the art will note also that the arrangement of EP 0560552 is difficult to clean, having the combustion chamber within the cooking container, and this increases the likelihood of residual food particles in the oil.

It is an object of the present invention to enable fat to be used in a portable cooker without a substantial risk of the fat being overheated.

BRIEF SUMMARY OF THE INVENTION

Thus according to the invention there is provided a cooker for used by troops on deployment, which cooker comprises a container for cooking fat, a fuel burner operable to burn fuel in combustion air and thereby generate heat, and a heating chamber between the burner and the container to diffuse heat from the burner over the container, wherein the burner is configured and arranged to produce a flame that does not contact the container.

By means of the invention localised overheating of the cooking fat is avoided by the diffusing effect of the heating chamber and by keeping the burner flame away from the fat container.

The burner preferably comprises a blast tube having a forward tip, a fuel injector rearward of the tip, a flame plate surrounding the fuel injector and arranged to deliver primary air wherein the fuel is atomised and burns to produce said flame, and an inlet arranged to deliver secondary air around the tip of the blast tube and thereby withhold the flame from the container. The flame plate may comprise a plurality of slots extending radially of the fuel injector, said slots being inclined so as to swirl the primary air. The blast tube may comprise an annular passage for the secondary air, which passage extends to a plurality of inwardly-directed vents circumferentially arranged around the blast tube near its tip.

In a preferred form, the heating chamber has a back wall wherein the burner is mounted, a front wall including an exhaust port, two side walls extending between the rear wall and the front wall, an intermediate wall extending transversely towards the side walls between the back wall and the front wall and two return walls extending from the intermediate wall rearwardly towards the back wall. The heating chamber may comprise a floor from which all said walls extend upwardly towards an open top closed by a base of said container. Preferably the walls and the floor are thermally insulated, and they may each comprise a sandwich of mineral wool insulation between metal mesh faces.

The fuel for the cooker is preferably diesel oil.

The burner may include a electric fan operative to deliver said combustion air under pressure, and an electric igniter for the fuel, and the cooker preferably includes a 24V power supply for the fan and the igniter.

The container for the cooking fat preferably includes a temperature sensor operative to measure the temperature of the fat in use. Preferably, too, it has a base sloping downwards towards a drain whereby the fat may be drained from the container.

The container may have a hinged lid which may be configured and arranged to fold and also to present a rack whereon food-frying baskets may be hung.

The container is preferably dimensioned to allow deep fat frying.

BRIEF DESCRIPTION OF THE SEVERAL VIEWS OF THE DRAWINGS

Other features of the invention will be apparent from the following description, which is made by way of example only with reference to the accompanying schematic drawings in which—

DESCRIPTION OF THE BEST MODE FOR CARRYING OUT THE INVENTION

Figure 1:
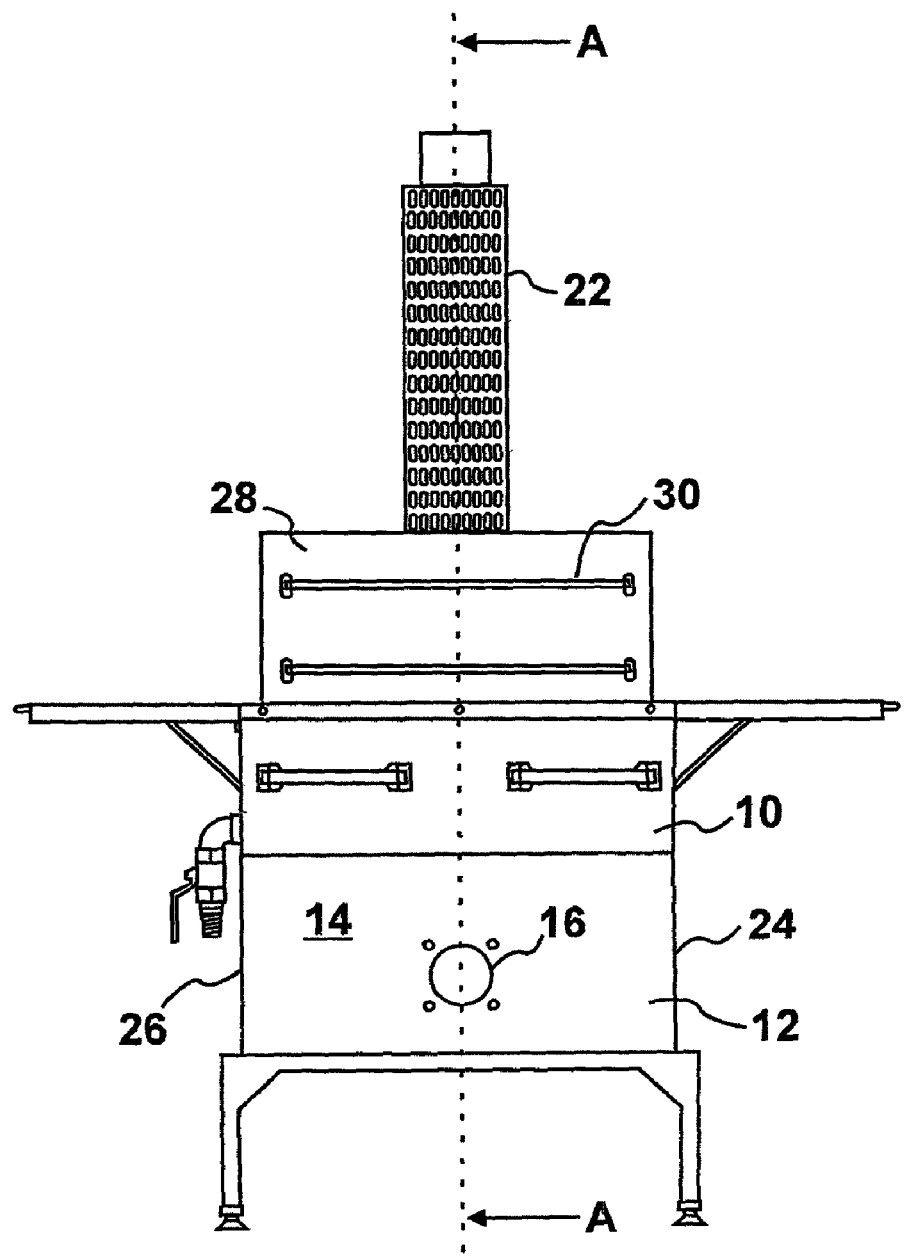
FIG. 1 shows in rear elevation a military cooker embodying the invention.
Figure 2:
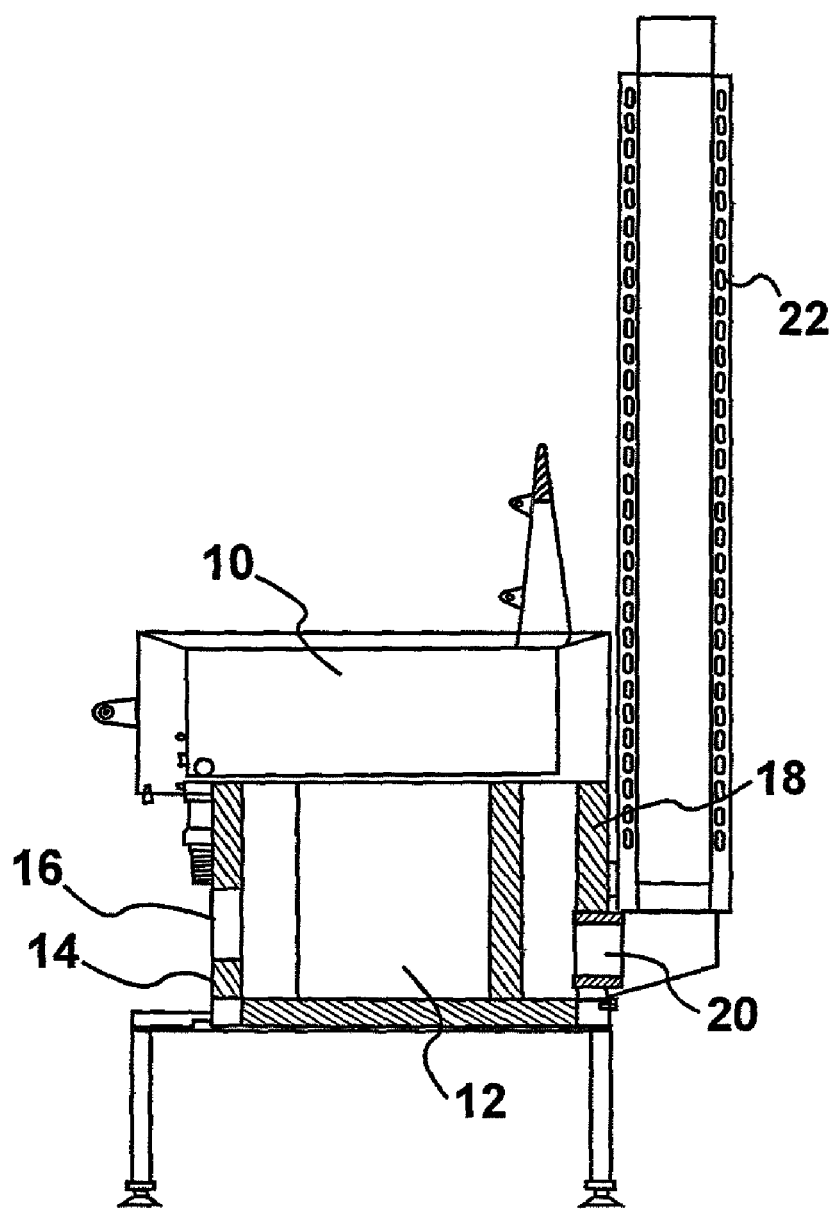
FIG. 2 is a cross-section along the line A-A in FIG. 1.

Referring first to FIGS. 1 and 2, the military cooker shown therein comprises a container 10 for cooking fat sitting upon a heating chamber 12. The heating chamber 12 has a back wall 14 formed with an aperture 16 to receive a burner (to be described in more detail hereinafter) and a front wall 18 formed with an exhaust port 20 communicating with a chimney 22. The heating chamber has side walls 24 and 26 extending between its front and back walls 18 and 14. The container has a hinged lid 28 (shown open in FIGS. 1 and 2) which folds to present a rack 30 for food frying baskets (not shown).

Figure 3:
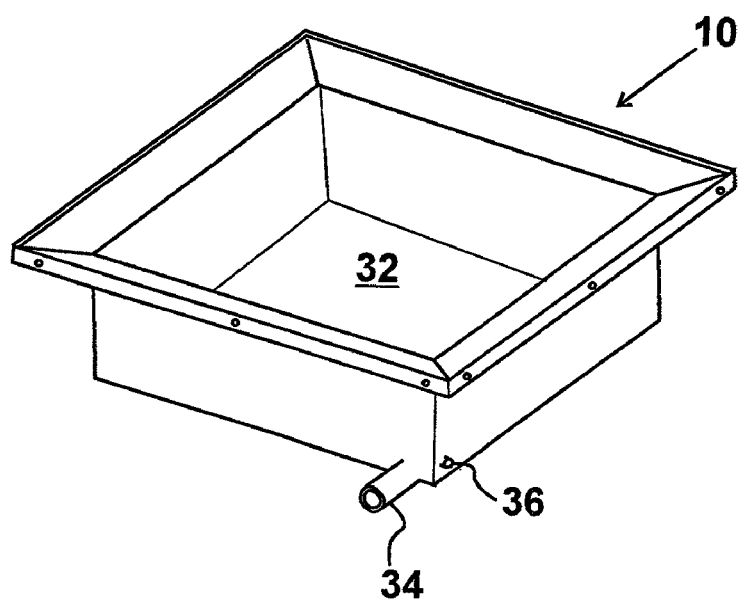
FIG. 3 is an isometric view from above of a cooking fat container shown in FIGS. 1 and 2.
Figure 4:
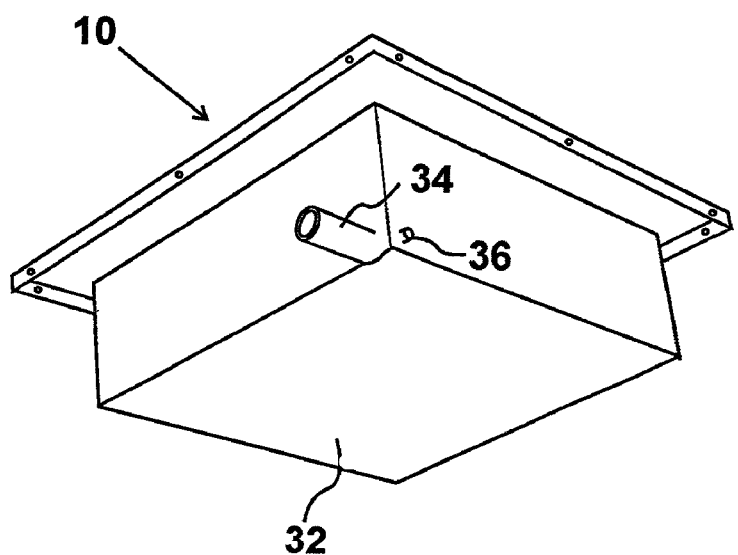
FIG. 4 is a view from below corresponding to FIG. 3.

Referring now to FIGS. 3 and 4, the container 10 is deep enough to permit deep fat frying. Its base 32 slopes generally downwards to a drain 34 in one corner. A temperature sensor 36 is provided to monitor the temperature of cooking fat in the container 10.

Figure 5:
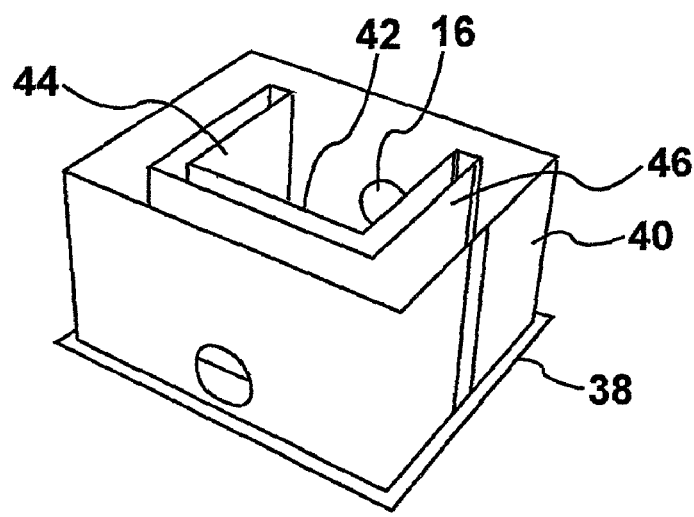
FIG. 5 is an isometric view of walls and floor of a heating chamber shown in FIGS. 1 and 2.
Figure 6:
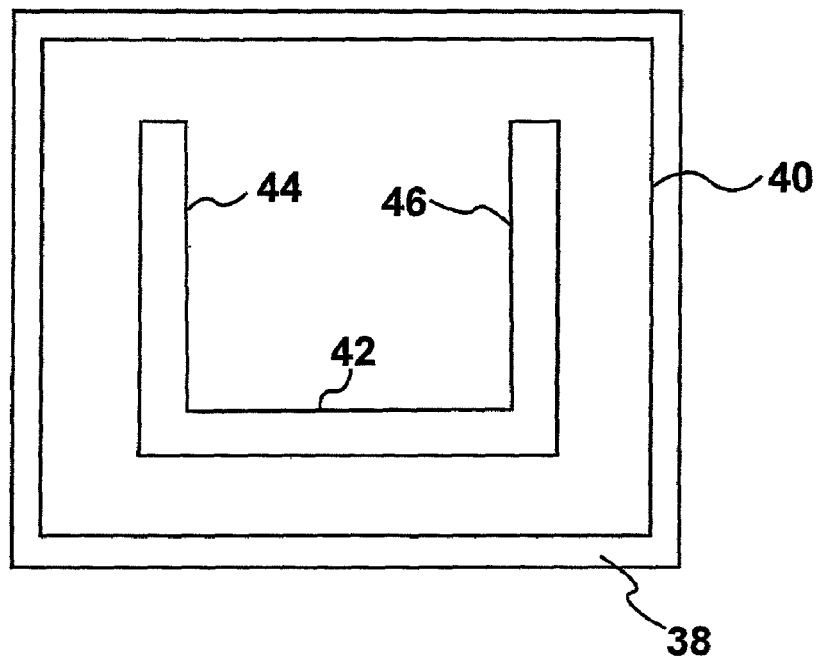
FIG. 6 is a plan view corresponding to FIG. 5.

Referring to FIGS. 5 and 6, within the heating chamber 12 is a wall and floor assembly comprising a metal mesh floor 38 and upwardly extending metal mesh walls 40, 42, 44 and 46. The wall 40 is a peripheral cage within which the wall 42 is so located as to provide an intermediate wall facing the burner aperture and the walls 44 and 46 are return walls extending rearwardly towards the rear wall. The wall 40 cooperates with the front wall 18, the rear wall 14 and the two side walls 24 and 26 to provide a space into which mineral wool insulation (not shown) is packed. The intermediate wall 42 and the return walls 44 and 46 are each double-skinned to allow mineral wool insulation to be inserted.

It should also be noted that the burner aperture 16 is vertically disposed so as to face the lower part of the intermediate wall 42. By this means hot gases from the burner curve around and upwards in the space defined by the walls 42, 44 and 46, thereby to be diffused over the base 32 (see FIGS. 3 and 4) of the container 10, which closes the open top of the heating chamber 12.

Figure 7:
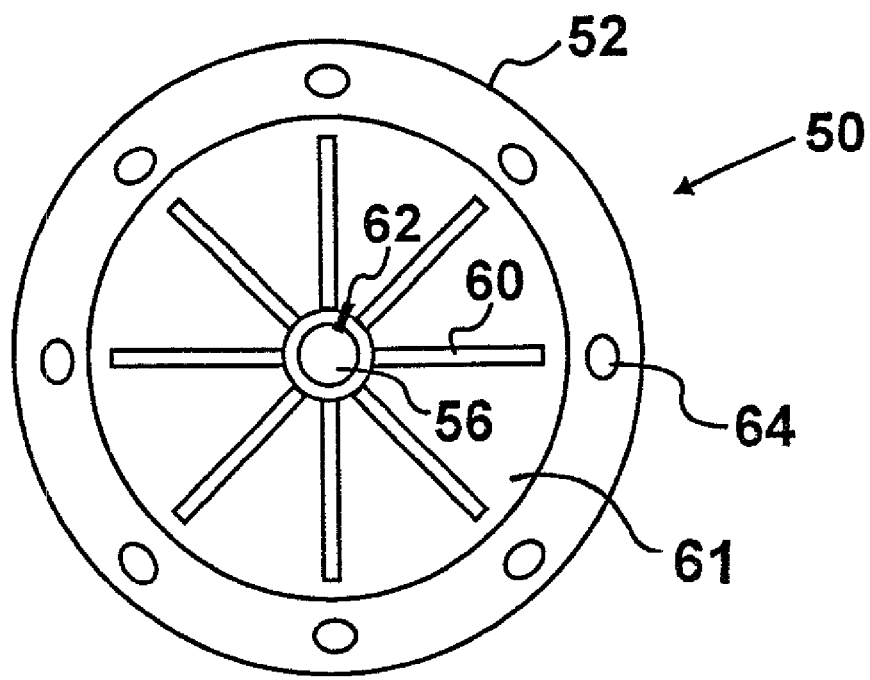
FIG. 7 schematically illustrates a burner of the cooker of FIGS. 1 and 2, looking rearwards.
Figure 8:
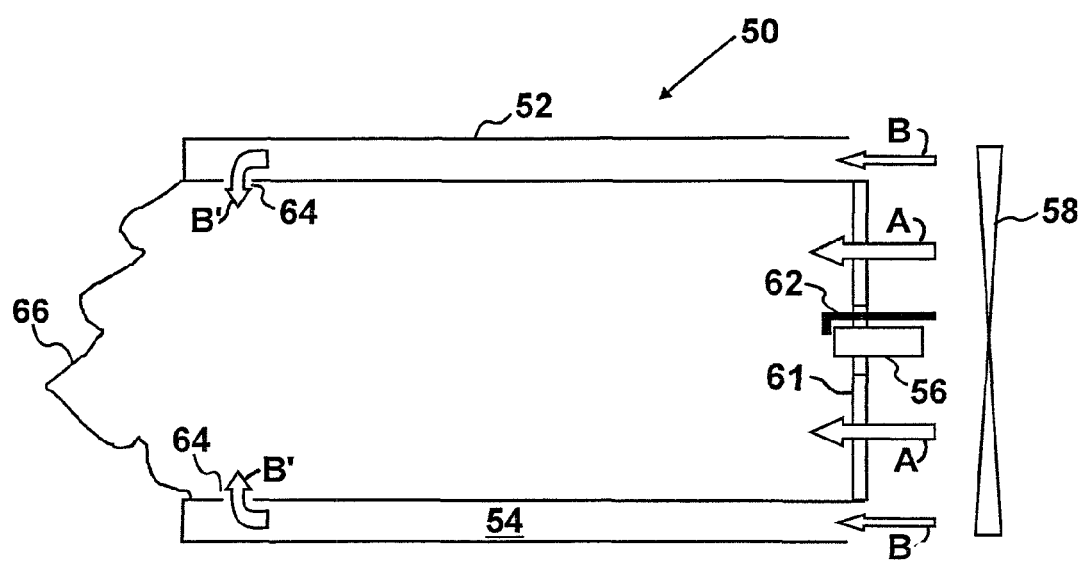
FIG. 8 is a side elevation corresponding to FIG. 7.

Referring now to FIGS. 7 and 8 the burner 50 illustrated schematically therein comprises a forwardly extending blast tube 52 having inner and outer walls providing therebetween an annular passage 54. At the rear end of the burner 50 is a fuel injector 56 whereby diesel fuel is supplied. A fan 58 supplies air under pressure to the burner 50. This air comprises (a) primary, combustion air indicated by arrows A which passes through radial slots 60 in a flame plate 61 and which is swirled by the configuration and arrangement of the radial slots 60 to atomise the fuel and allow it to be ignited by an igniter 62 and (b) secondary, non-combustion air indicated by arrows B which passes through vents 64 as indicated by arrows B'. The effect of this secondary air is that the flame front 66 extends only a very short distance forward of the forward end of the blast tube 52, and thus it is kept away from direct contact with the container 10. The fan 58 and the igniter 62 are each powered by a 24V power pack (not shown).

Various possible additions and modifications will be apparent to those skilled in the science.

The invention claimed is:

1. A cooker for use by troops on deployment, which cooker comprises a container for cooking fat, the container having a base and a drain for driaing fat from the container, a fuel burner operable to burn fuel in combustion air and thereby generate heat for heating fat in the container, and a heating chamber between the burner and the container for diffusing heat from the burner to spread said heat over the container, wherein the burner comprises a blast tube extending from a rear end to a forward tip, a passage extending from the rear end to the forward tip with vents around the blast tube adjacent said forward tip, a fuel injector within and adjacent the rear end of the blast tube, a fuel igniter adjacent the fuel injector, and means for supplying primary, combustion air to the blast tube wherein ignited fuel will burn to produce a flame and for supplying secondary, non-combustion air to the passage to flow therethrough to said vents and surround the flame upon exit through the vents.

2. A cooker as claimed in claim 1 wherein the means for supplying combustion air through the blast tube includes a flame plate surrounding the fuel injector and arranged to deliver primary, combustion air wherein fuel is atomised for burning to produce said flame, and wherein the means for supplying secondary, non-combustion air through said passage to said vents is arranged to deliver secondary air through said vents and around the tip of the blast tube to thereby withhold the flame from the container.

3. A cooker as claimed in claim 2 wherein the flame plate comprises a plurality of slots extending radially of the fuel injector, said slots being configured and arranged so as to swirl the primary air.

4. A cooker as claimed in claim 2 wherein the passage around the blast tube comprises an annular passage for the secondary air, which passage extends to a plurality of inwardly-directed vents circumferentially arranged around the blast tube near its tip.

5. cooker as claimed in claim 1 wherein the heating chamber has a back wall wherein the burner is mounted, a front wall including an exhaust port, two side walls extending between the rear wall and the front wall, an intermediate wall extending transversely towards the side walls between the back wall and the front wall and two return walls extending from the intermediate wall rearwardly towards the back wall.

6. A cooker as claimed in claim 5 wherein the burner is disposed to face the lower part of the intermediate wall.

7. A cooker as claimed in claim 5 wherein the heating chamber comprises a floor from which all said walls extend upwardly towards an open top closed by a base of said container.

8. A cooker as claimed in claim 5 wherein the walls and the floor are thermally insulated.

9. A cooker as claimed in claim 8 wherein the walls and the floor each comprise a sandwich of mineral wool insulation between metal mesh faces.

10. A cooker as claimed in claim 1 wherein the fuel is diesel oil.

11. A cooker as claimed in claim 1 wherein the burner includes an electric fan operative to deliver said combustion air under pressure.

12. A cooker as claimed in claim 11 wherein the burner includes an electric igniter for the fuel.

13. A cooker as claimed in claim 12 wherein the cooker includes a 24 V power supply for the fan and the igniter.

14. A cooker as claimed in claim 1 wherein the container includes a temperature sensor operative to measure the temperature of the fat in use.

15. A cooker as claimed in claim 1 wherein the container has a base sloping downwards towards a drain whereby the fat may be drained from the container.

16. A cooker as claimed in claim 1 wherein the container has a hinged lid.

17. A cooker as claimed in claim 16 wherein the lid is configured and arranged to fold.

18. A cooker as claimed in claim 17 wherein the folded lid presents a rack whereon food-frying baskets may be hung.

19. A cooker as claimed in claim 1 wherein the container is dimensioned to allow deep fat frying.

* * * * *